No. 666,179. Patented Jan. 15, 1901.
C. E. BRADISH.
TIRE.
(Application filed Sept. 18, 1900.)
(No Model.)
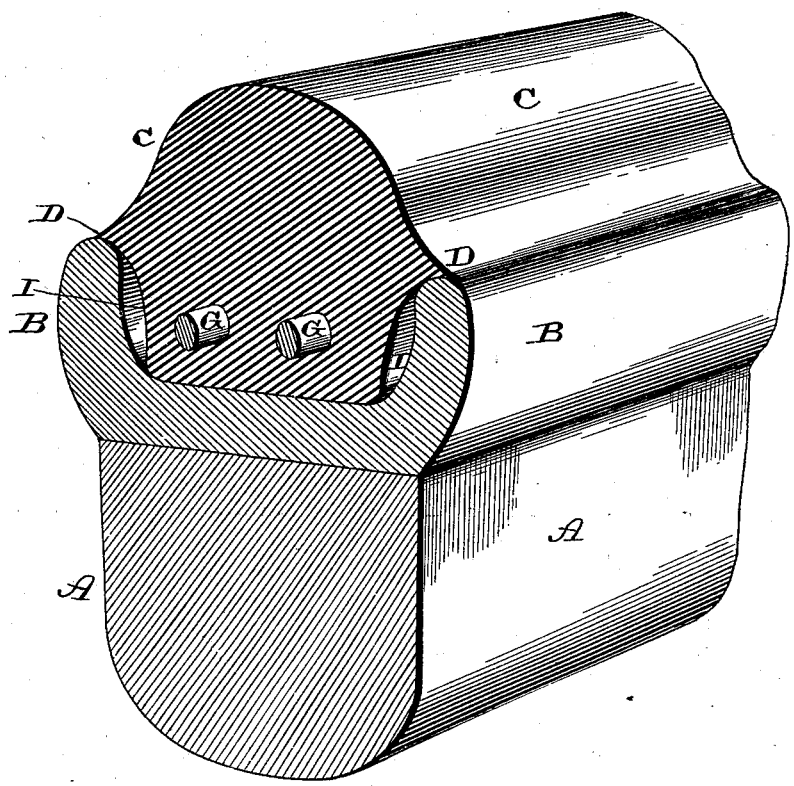
Witnesses
E. W. Hart
Rosann S. Smith.
Inventor
Chas E Bradish

UNITED STATES PATENT OFFICE.

CHARLES E. BRADISH, OF MOLINE, ILLINOIS.

TIRE.

SPECIFICATION forming part of Letters Patent No. 666,179, dated January 15, 1901.

Application filed September 18, 1900. Serial No. 30,418. (No model.)

*To all whom it may concern:*

Be it known that I, CHARLES E. BRADISH, a citizen of the United States, residing at Moline, in the county of Rock Island and State of Illinois, have invented certain new and useful Improvements in Tires; and I do declare the following to be a full, clear, and exact description of the invention, such as will enable others skilled in the art to which it appertains to make and use the same, reference being had to the accompanying drawing, and to the letters of reference marked thereon, which forms a part of this specification.

My invention relates to cushion rubber tires for vehicle-wheels; and its objects are to so construct a rubber tire that it can expand laterally under pressure within the channel, and thus avoid its splitting, and to more than double the amount of wear and tear that can be obtained from rubber tires as ordinarily made.

My invention consists in a rubber tire provided with lips or flanges upon opposite sides, so as to extend over the outer edges of the channel to prevent sand, dirt, and gravel from working between the sides of the tire and the inner sides of the channel, and in forming spaces on opposite sides of that portion of the tire which is between the sides of the channel, so that the tire can expand laterally under pressure, all of which will be more fully described hereinafter.

The accompanying drawing, which represents my invention, is a section of a tire shown in perspective.

A represents the rim, and B the channel, which is secured thereto in the ordinary way. This channel may be constructed of the form here shown or any other that may be preferred, as I do not restrict my invention to any particular shape. The tire C is made of rubber and has formed upon opposite sides the lips D, which extend out over the outer edges of the channel, and thus prevent sand, dirt, gravel, or water from working in between the sides of the tire and the inner sides of the channel. Where these lips do not extend out over the outer edges of the flanges of the channel sand, dirt, and gravel work in between the sides of the flanges and the sides of the tire and soon cut and injure the tire, so that it is practically ruined. These substances getting between the flanges of the channel and the sides of the tire by constant working cut into and destroy the tire in a very short time. By forming the lips as here shown, so as to extend out over the outer edge of the flanges, it is impossible for sand, dirt, and gravel to get inside of the channel, and hence the life of the tire is prolonged to an indefinite degree.

Heretofore but very little, if any, attempt has been made to allow the rubber tire to expand laterally within the channel, and the result is that a constant pull is exerted upon the rubber from the wires G outward to the edge of the tire, and in the course of time these tires split longitudinally from the wires to the rim. In order to prevent this trouble, I provide for the lateral expansion of the tire within the channel, and for this purpose form the spaces I on opposite sides of the tire, as shown. These spaces preferably extend from the under side of the lip down to the base of the tire; but I do not limit myself to any particular form of spaces. These spaces, taken in connection with the lips, allow the tire to expand and contract without exerting any strain or pull upon the tire, so as to cause it to split and without any danger of the tire becoming worn and injured by sand, gravel, or dirt working into the recess. The lip forms a necessary part of the tire in connection with the space or recess, for while the spaces permit the tire to expand laterally the lips prevent the recesses from becoming filled with substances which would have a tendency to destroy the tire. These lips must extend out over the outer edges of the flanges upon the channel, or constant movement of the rubber as it expands and contracts will soon wear away or split any projecting part made upon the tire within and against the inner sides of the flanges.

It is well known that more vehicle rubber tires go to pieces and are destroyed by sand or gravel getting under the rubber or wedging in between the rubber and steel than are worn out by all the wear on the tread of the tire. By experience and careful tests I find that using the shape of rubber and adjusting the same as here shown doubles the life of the tire and adds greatly to its cushion qualities, the amount of the resilience being nearly double that of the same rubber with its base confined between the flanges of the channel. It will readily be seen from the shape here shown that at no point is the rubber prevented from spreading or expanding, and at the same time everything is excluded or prevented from getting between the rubber and the flange.

Having thus described my invention, I claim—

A rubber tire provided with lips or flanges upon its opposite outer edges to extend over the outer edges of the flanges upon the channel, and having spaces in opposite sides which extend from the under side of the lips to the lower edge of the tire, combined with a channel inside of which the base portion of the tire is placed, and the rim to which the channel is secured, substantially as described.

In testimony whereof I affix my signature in presence of two witnesses.

CHAS. E. BRADISH.

Witnesses:
ALFRED C. NEWMAN,
ROSANN S. SMITH.